Patented July 15, 1941

2,249,518

UNITED STATES PATENT OFFICE 2,249,518

PLASTICIZED CELLULOSE DERIVATIVE COMPOSITION

Joseph B. Dickey and James G. McNally, Rochester, N. Y., assignors to Eastman Kodak Company, Rochester, N. Y., a corporation of New Jersey No Drawing. Application December 16, 1938, Serial No. 246,202

2 Claims. (Cl. 106—176)

This invention relates to compositions of matter in which cellulose derivatives, such as cellulose acetate, cellulose nitrate or cellulose ethers, are combined or mixed with other substances, such as a compatible plasticizer, and a common solvent for both, with or without other useful addition agents, so that the resulting product will have properties such as will make the composition highly advantageous for use in the plastic and analogous arts, such, for instance, as the manufacture of wrapping sheets, photographic film, artificial silk, varnishes or lacquers, and the like.

One object of this invention is to produce a composition of matter which may be made into permanently transparent, strong and flexible sheets or films of desired thinness which are substantially waterproof, are unaffected by ordinary photographic fluids and possess the desired properties of a support for sensitive photographic coatings. Another object of our invention is to produce a composition which is capable of easy and convenient manipulation in the plastic and analogous arts, such as in the manufacture of sheets, films, artificial silk filaments, varnishes, lacquers and the like, and to produce a composition which will not injure, or be injured by, the substances or surfaces with which it is associated during manufacture. Other objects will become apparent to those skilled in the art to which this invention pertains.

While cellulose acetates, nitrates and ethers have been known for decades it has also been known that to utilize them in the various plastic arts it is necessary to mix therewith such plasticizing or conditioning agents as camphor, castor oil, triphenyl phosphate, monochlornaphthalene or the like. Certain of these and other addition agents are also added for the purpose of reducing the inflammability of the product. Plastic inducing agents, such as the higher alcohols and their esters, are sometimes also added. Similarly, addition compounds of various kinds have been employed to increase flexibility, transparency, toughness, and other properties which will enhance the value of the resulting product. Addition products for the same or similar purposes are also added to cellulose acetates, nitrates and ethers to prepare them for use in the other plastic arts, such as in the manufacture of lacquers, varnishes, artificial silk filaments, moulded compounds and the like. While the plasticizers or other addition agents heretofore discovered have had their utility in the art, the increasing use to which cellulose derivatives have been put and the increasing number of desirable properties required of the cellulose derivative for most purposes has made the discovery of new and economical plasticizers or other addition agents a matter of considerable importance to the art.

We have discovered that valuable properties may be induced in and/or contributed to compositions containing cellulose derivatives such as cellulose acetate, by adding thereto as plasticizing compounds morpholine derivatives having the general formula:

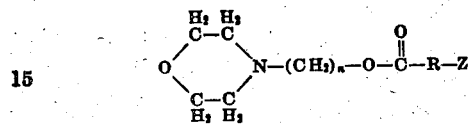

wherein $n$ represents a positive integer greater than one and less than 4, R represents a divalent organic group, Z represents a group selected from the group consisting of hydrogen and an organic group of the following general formula:

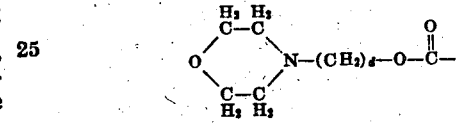

wherein $d$ represents a positive integer greater than one and less than four.

These compounds may be prepared by treating hydroxyalkylated morpholine derivatives with the desired acid, acid chloride, or anhydride by known methods. In case an acid is used, the compound may be esterified by removing water by means of an azeotropic withdrawing agent.

Examples of the preparation of typical compounds of this type are as follows:

PREPARATION OF ESTERS

*Morpholine ethyl furoate*

143 parts of furoyl chloride and a solution of 50 parts sodium hydroxide in 225 parts water are added simultaneously to 130 parts morpholine ethanol, with vigorous stirring. The temperature is kept at 15-20° by means of an ice bath. The mixture is then stirred two hours, allowing the temperature to rise to that of the room. The resultant aqueous oil mix is then extracted twice with benzene (200 and 100 parts). The benzene is distilled off at atmospheric pressure and the residue fractionated in vacuo. Morpholine ethyl furoate boils at 190-195°/21 mm. It is soluble in water.

Morpholine ethyl tetrahydrofuroate 223 parts of morpholine ethyl furoate and 5 parts Raney nickel are shaken in an autoclave with hydrogen at 2000 lb. pressure and 150° C. until the theoretical quantity of hydrogen has been absorbed (4–6 hr.) The resulting product is then filtered and distilled. Morpholine ethyl tetrahydrofuroate boils at 185–190°/23 mm. It is water soluble.

Morpholine ethyl succinate 118 parts succinic acid, 120 parts morpholine ethanol, 150 parts toluene, and 1 part p-toluene sulfonic acid are distilled in such a way that the toluene is continuously separated from the water formed and returned to the reaction. The heating is discontinued when 18 parts of water have been collected. The solution is then treated with a small amount of sodium bicarbonate, filtered, and the toluene distilled off. The residue is then fractionated in vacuo. The ester boils at 250–255°/6 mm. It is water soluble.

In the following examples and description we have set forth several of the preferred embodiments of our invention, but they are included merely for purposes of illustration and not as a limitation thereof.

Example 1

| | Parts |
|---|---|
| Cellulose acetate | 100 |
| β-Hydroxyethyl morpholine acetate | 80 |
| Acetone | 400 |

Example 2

| | Parts |
|---|---|
| Cellulose acetate | 100 |
| γ-Hydroxypropyl morpholine butyrate | 20 |
| Acetone | 300 |
| Methanol | 100 |

Example 3

| | Parts |
|---|---|
| Cellulose acetate | 100 |
| β-Hydroxyethyl morpholine succinate | 30 |
| Ethylene chloride | 300 |
| Dioxane | 100 |

Example 4

| | Parts |
|---|---|
| Cellulose acetate | 100 |
| γ-Hydroxypropyl morpholine adipate | 20 |
| Triphenyl phosphate | 20 |
| Acetone | 300 |
| Ethyl acetate | 100 |

Example 5

| | Parts |
|---|---|
| Cellulose acetate propionate | 100 |
| Butyl phthalate | 20 |
| β-Hydroxyethyl morpholine phthalate | 30 |
| Propylene chloride | 200 |
| Ethyl lactate | 100 |
| Acetone | 100 |

Example 6

| | Parts |
|---|---|
| Cellulose nitrate | 100 |
| β-Hydroxy-β-ethoxyethyl morpholine furoate | 30 |
| Ester gum | 40 |
| Ethyl acetate | 200 |
| Toluene | 100 |
| Ethanol | 100 |

Example 7

| | Parts |
|---|---|
| Cellulose butyrate | 100 |
| β-Hydroxyethyl morpholine tetrahydrofuroate | 20 |
| Propylene chloride | 300 |
| Acetone | 100 |

Example 8

| | Parts |
|---|---|
| Cellulose acetate butyrate | 100 |
| β-Hydroxyethyl morpholine laurate | 15 |
| Triphenyl thiophosphate | 8 |
| Ethylene chloride | 400 |
| Methanol | 100 |

Example 9

| | Parts |
|---|---|
| Ethyl cellulose | 100 |

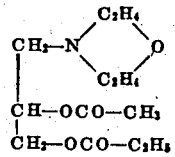

| | Parts |
|---|---|
| Acetone | 400 |

Composition of matter prepared as above described may be deposited upon any suitable film forming surface to form a film or sheet, as is well known to those skilled in the art. A film so produced has permanently brilliant transparency and low inflammability, burning no more readily than ordinary newsprint. Such film is exceedingly tough and flexible, as shown by the fact that it will withstand many folds upon a modified Schopper fold-tester (commonly used for such purposes) without breaking and that even after being subjected for a considerable number of days to air maintained at a temperature of 65° C. the film still maintains flexibility (in contrast to almost complete lack of flexibility where no plasticizer is used) demonstrating that the film will withstand ordinary usage satisfactorily for many years. The sum total of the above advantageous properties of a product produced from our new composition is considerably in excess of that of products produced with what have previously been regarded as the better plasticizers.

In order that those skilled in this art may better understand our invention we would state, by way of illustration, that for the manufacture of photographic film or other sheets our new composition of matter may be compounded as follows: 100 parts of acetone soluble cellulose acetate, i. e. cellulose acetate containing from 38% to 42% acetyl radical, approximately, is dissolved with stirring at atmospheric temperature in 300 to 500 parts, preferably 400 parts, by weight, of acetone. To this solution may be added from 5–50 parts by weight, of any one of the above plasticizers, it being found preferable to employ approximately 30 to 40 parts thereof. The amount of plasticizer may be decreased or increased, depending upon whether it is desired to decrease or increase, respectively the properties which this plasticizer contributes to the finished product. The amount of solvent employed may also be decreased or increased, depending upon whether it is desired to have a more or less freely flowing composition, respectively.

Other similar solvents than those mentioned above which are compatible with the cellulose acetate and our new plasticizers may also occur to those skilled in this art. In like manner our plasticizers may be compounded with other single or mixed organic esters of cellulose, such as cellulose aceto-stearate, aceto-malate, or cellulose nitro-acetate, or with the cellulose ethers, a suitable solvent which will dissolve both the cellulosic derivative and the plasticizer being employed.

Inasmuch as our above described composition of matter is quite useful in the production of films and sheets it will be apparent that our new plasticizers may also be employed with advantage in the other branches of the plastic art. For example, as set forth in our copending application filed of even date herewith, compositions of matter similar to those described herein may be employed in the manufacture of artificial silk by the dry spinning method. With a proper coagulating bath they may be employed for wet spinning. It may be desired to employ a composition of different viscosity or evaporation characteristics, but this is a mere matter of changing the solvent proportion or adding evaporation retardents or other high or intermediate boiling constituents, as has been well known in the art for more than a decade.

Our novel plasticizers may be employed also with advantage in connection with a number of the known lacquer and varnish formulas with which it may be found to be compatible. In such cases the plasticizer is usually first put into solution with the cellulose derivative solution and, if non-solvents are added, only to such an extent as will not precipitate the derivative from solution. Also the plasticizer is usually employed in larger amounts, such as from 50 to 60 parts, in compounding lacquers. Other uses within the scope of our invention will also suggest themselves to those skilled in the art and are to be included within the scope of the claims appended hereto.

What we claim is:

1. A composition of matter comprising a cellulose derivative selected from the group consisting of cellulose esters and ethers and 15–80% based on the weight of the cellulose derivative of a morpholine ester having the general formula:

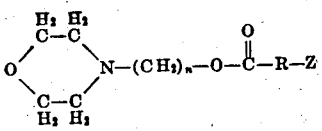

wherein $n$ represents a positive integer greater than one and less than four, R represents a divalent organic group, Z represents a group selected from the group consisting of hydrogen and an organic group of the following general formula:

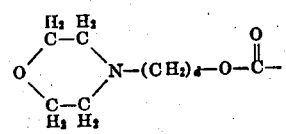

wherein $d$ represents a positive integer greater than one and less than four.

2. A composition of matter comprising cellulose acetate and 15–80%, based on the weight of the cellulose acetate, of a morpholine ester having the general formula:

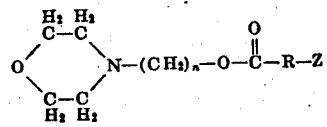

wherein $n$ represents a positive integer greater than one and less than four, R represents a divalent organic group, Z represents a group selected from the group consisting of hydrogen and an organic group of the following general formula:

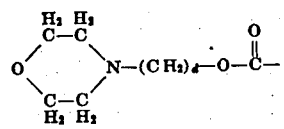

wherein $d$ represents a positive integer greater than one and less than four.

JOSEPH B. DICKEY.
JAMES G. McNALLY.